Patented June 26, 1945

2,379,261

UNITED STATES PATENT OFFICE 2,379,261

UNSATURATED ESTERS

Franklin Strain, Barberton, Ohio, assignor to Pittsburgh Plate Glass Company, Pittsburgh, Pa., a corporation of Pennsylvania No Drawing. Application March 28, 1944,
Serial No. 528,445

7 Claims. (Cl. 260—463)

This invention relates to a group of new unsaturated ester-amides having valuable applications especially in the field of synthetic resins.

One purpose of my invention is to prepare new compositions capable of being polymerized through olefinic groups into synthetic resins having improved tensile and flexural strength properties. A further purpose of this invention is to provide a novel and simple method of preparing useful synthetic resins.

My new compounds are the N,N' bis [(oxycarbalkenyloxy) alkyl] substituted amides of dibasic acids in which the unsaturation of the alkenyl grouping is adjacent the second carbon atom from the carbonyldioxy group. More specifically, the compounds are the N,N' substitution products of urea, oxamide, phthalamide, succinamide, adipamide, and the corresponding diamides of other dibasic acids.

The new compounds have the following structural formula:

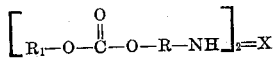

in which $R_1$ is an alkenyl radical in which the olefinic linkage is in the allyl or vinyl position, R is the divalent alkylene radical, and X is a carbonyl containing radical such as —CO—, —CO—CO—, —CO—R—CO—, and —CO—O—R—O—CO—

The compounds of my invention may be readily prepared by the reaction of unsaturated chloroformates such as allyl chloroformate or vinyl chloroformate with complex glycols such as N,N' bis (2-hydroxy ethyl) urea, N,N' bis (2-hydroxyethyl) phthalamide, and other glycols containing amide linkages between the hydroxyl groups. The vinyl chloroformate used in the above reaction can be prepared by the pyrolysis of ethylene glycol bis chloroformate as described and claimed in application Serial 504,292 filed September 29, 1943, by Frederick E. Küng.

The complex glycols described above can be prepared by the reaction of ethanolamine, propanolamine, or other amino alcohol with the dialkyl esters of dibasic acids such as diethyl oxalate, diethyl carbonate, diethyl phthalate, and diethyl adipate. In accordance with this procedure the reagents, including a substantial excess of the amino alcohol, are mixed and refluxed under vacuum in the presence of an interchange catalyst, if desired, such as anhydrous trisodium phosphate. The reaction should be continued until substantially all of the theoretical quantity of the alkyl alcohol has been evolved. The complex glycol containing amide groups may then be separated, for example by crystallization from methyl alcohol solutions. These intermediate products may be liquids but frequently are white solids having well defined melting points.

The new esters are then prepared from the intermediate dihydroxy amides by reaction with allyl chloroformate or other unsaturated chloroformate. In order to facilitate the reaction of the liquid chloroformate with the solid hydroxyamides it is desirable to have present a substantial quantity of a suitable solvent such as dioxane. The reaction is conducted in the presence of pyridine or other cyclic tertiary amine or other alkaline reagent such as the carbonates, oxides, or hydroxides of alkali or alkali earth metals. It is desirable to conduct the reaction at temperatures of 10° C. or less which temperature can be maintained by a bath of a suitable freezing mixture. The reaction, being exothermic, is controlled by combining the reagents gradually, thereby preventing an excessive elevation in temperature. By stirring the mixed reagents vigorously local overheating may be avoided. The product in solution is washed successively with dilute hydrochloric acid, dilute sodium carbonate, and with water. After drying and decolorizing by heating with activated charcoal at 70° C., the product is separated from the solvent by heating on a steam bath. The new ester-amides, if solid, are obtained in crystal form upon cooling. Accordingly, further purification is possible by recrystallization from methyl alcohol solutions.

Other methods of preparation of the dihydroxy amides will be apparent to a skilled chemist. For example, the carbamide or urea derivative of the new class of compounds may be prepared by first reacting urea and ethanol amine hydrochloride and subsequently reacting the resulting N,N' bis (hydroxyethyl) urea with allyl chloroformate in the manner described above. Other of the new compounds may be prepared in analogous fashion from the amides of dicarboxylic acids.

The new class of compounds may also be prepared by reacting the dihydroxy amide intermediates with phosgene to form the corresponding dichloroformates. The dichloroformate intermediate is subsequently reacted with an unsaturated alcohol, such as allyl alcohol, in the presence of an alkaline agent at temperatures less than normal room temperatures to produce the new class of esters. This reaction is analogous to the above described reaction between the dihydroxy compound and the unsaturated chloroformate and the preferred operating conditions described above are applicable hereto.

The new polymerizable compounds of the invention are usually crystalline solids but in some instances may be liquids of relatively high boiling point. The new compounds are usually readily fusible at temperatures of 50–150° C. which are used to polymerize the new compounds into transparent resinous products having unusually valuable physical properties.

The new ester amides are capable of being polymerized when subjected to heat or ultraviolet light especially in the presence of polymerization catalysts such as organic peroxy compounds. During polymerization the liquid monomers gradually become viscous and finally set to form colorless transparent gels which are rigid and quite tough. If the initial polymerization has been conducted at a moderate temperature in the presence of an oxygen yielding catalyst it is possible to obtain an intermediate product which contains some unused catalyst. Such compositions are soluble and fusible and are capable of further polymerization to form hard resins which are neither soluble nor fusible. When the initial catalytic polymerization is induced at higher temperatures the rate of decomposition of catalyst may exceed the rate of polymerization and relatively softer polymer will then be formed. This inefficient utilization of catalyst is undesirable. For each combination of esteramide and catalyst there is an optimum quantity of catalyst and temperature of polymerization which will enable the development of the maximum strength in the polymer.

There is a further practical limitation on the rate of polymerization. The polymerization reaction, being exothermic, must be slow enough to permit the dissipation of the heating of reaction. Otherwise, the rise in temperature will increase the rate of polymerization, thereby generating progressively increasing quantities of heat until the polymer is destroyed by heat fractures. High polymerization temperatures may also cause discoloration of the polymer. Accordingly, lower temperatures are preferred. Generally, the highest temperature which will yield a satisfactory resin product, should be used.

Polymerization may occur in the absence of catalysts, but higher temperatures are required. Due to the difficulty of maintaining uniform polymerization conditions and due to the discoloration and fracturing induced at higher temperatures, polymerization in the presence of peroxy catalysts is preferred.

The quantity and kind of peroxy catalyst to be used should be determined by the nature of the monomer to be reacted. Very active monomers such as the vinyl esters require only small quantities of catalyst, for example, from 0.01 percent to 0.5 percent by weight of the monomer, while moderately active monomers, such as the allyl derivatives, may require up to 5.0 percent of catalyst. It has been found that different types of peroxy catalysts are effective at different temperatures; for example, the percarbonates will catalyze the reaction at 30° to 60° C., acyl peroxides are effective at an intermediate range (65° to 95° C.), while the ketone peroxides are effective at temperatures in excess of 110° C. The kind of catalyst should be selected in accordance with the activity of the monomer. For very active vinyl derivatives low temperature catalysts are preferred since at high temperatures the polymerization may be too rapid. Conversely, relatively less active monomers such as crotyl or cinnamyl esters must be heated to relatively high temperatures and require a catalyst which will be stable until the higher temperature polymerization zones are reached.

In the usual polymerization procedure it has been found desirable to initiate the reaction at relatively low temperatures. After the polymerization has begun it is possible to increase the temperature with less danger of heat fracture and discoloration. Accordingly, the quickest satisfactory reaction is obtained by raising the temperature as rapidly as possible without fracturing or discoloring the product. Such gradually increasing temperature schedules are more efficient in the utilization of peroxy catalysts since they promote a more nearly uniform reaction rate throughout the entire polymerization. The temperature schedules may be devised by trial and error methods, or they may be determined experimentally by analyzing for peroxy compound during the progress of the reaction and regulating the temperature so that the peroxy compound is consumed at a uniform rate. The following time-temperature schedule is typical for the polymerization of the new compounds when benzoyl peroxide is used as the catalyst:

| Temperature | Time |
|---|---|
| ° C. | Hours |
| 70 | 1 |
| 71 | 2 |
| 72 | 3 |
| 74 | 4 |
| 76 | 5 |
| 78 | 6 |
| 81 | 7 |
| 85 | 8 |
| 90 | 9 |
| 96 | 10 |
| 104 | 11 |
| 115 | 12 |

The new esters are useful in many applications such as in coating compositions, in laminated fabrics or in impregnation of cloth or random fiber compositions or as adhesives. They are valuable because of the very small loss of volume or shrinkage which occurs during polymerization. For this reason they are very useful in the preparation of cast shapes, especially where transparent, translucent or light colored products are required. Generally any irregular shaped article normally made of glass may be advantageously constructed with the new resins because of the increased toughness and high flexural strength obtained without much sacrifice in abrasive resistance.

The new materials may be copolymerized with other thermosetting resins or with the thermoplastic synthetics such as vinyl acetate, styrene, methyl methacrylate, vinyl chloride, vinylidene chloride or other materials capable of ethylenic polymerization.

Further details of the preparation and use of the new materials are set forth in the following examples:

Example I

A two molal quantity (122 g.) of ethanolamine and 200 g. of concentrated hydrochloric acid were slowly mixed in a one liter flask. The flask was provided with a reflux condenser to prevent the evaporation of the ethanolamine as the temperature of the mixed reagents increased during the addition. Urea (54 g.) and 450 g. of water were added and the mixture refluxed for 5 hours. The water was removed by heating under a vacuum and the solid ammonium chloride separated and washed with a 25 cc. of methanol. The filtrate and the methanol wash solution were combined and cooled to 0° C. A large quantity of white crystalline material was obtained. The filtrate which contained unreacted urea and monosubstituted urea was again reacted with a further quantity of ethanol amine in hydrochloric acid. Upon cooling more of the white crystalline product was obtained. The two lots of product were combined and recrystallized from cold methyl alcohol. This white crystalline solid having a melting point of 83° C. was identified as N,N' bis (2-hydroxyethyl) urea. The above product (96 g.) was mixed with 100 ml. of benzene and 113 g. of pyridine in a 3 necked flask fitted with thermometer, stirrer, and dropping funnel. The reaction mixture was cooled to 0° C. and 161 g. of allyl chloroformate was added slowly through the dropping funnel at a rate which permitted the maintenance of temperature below 5° C. Throughout the reaction the mixture was stirred vigorously to prevent local increases in temperature. When reaction was completed 50 g. of ice water was added, the benzene layer was separated and was washed successively with 1 percent hydrochloric acid, 5 percent sodium carbonate, and water. The volatile impurities were then removed by heating at 100° C. at 4 mm. pressure. The product was decolorized by heating with 5 g. of decolorizing carbon for one-half hour at 70° C. After filtering a light yellow transparent liquid was obtained which solidified on standing. The solid was recrystallized from methanol and dried to yield a white crystalline solid having a melting point of 48-49° C. The compound was identified as N,N' bis [(2-oxycarballyloxy)ethyl] urea having the following structure:

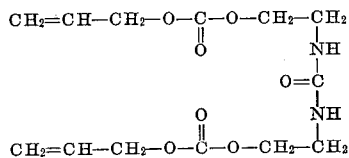

A ten gram sample was heated in a test tube for two hours at 60° C. with 3 percent isopropyl percarbonate. A transparent solid gel was formed.

*Example II*

Ethyl oxalate (160 g.) was cooled to 0° C. and mixed with 120 g. of ethanolamine. The reaction mass was dissolved in 1200 cc. of boiling ethyl alcohol and cooled, thereby precipitating a white crystalline solid which was washed with cold ethanol. The solid had a melting point of 163-164° C. and was identified as N,N' bis (2-hydroxyethyl) oxamide.

The N,N' bis (2-hydroxyethyl) oxamide (161 g.) was dissolved in 1000 ml. of benzene and cooled to 0° C. by immersing the reaction flask in a salt-ice mixture. The flask was provided with a stirrer, a thermometer, and a dropping funnel. Pyridine (175 g.) was added to the reaction vessel and 250 g. of allyl chloroformate then added slowly at a rate such that the reaction temperature did not exceed 5° C. After the reactants were completely mixed the mass was stirred for 30 minutes while maintaining the temperature at approximately 0° C. The mass was then mixed with 2000 g. of ice and separated into two liquid phases. The benzene layer was washed with dilute hydrochloric acid, with sodium carbonate solution, and with water. The solution was then heated at reflux temperature for 30 minutes with one percent of activated charcoal. Upon cooling white crystals were obtained which were washed with cold ethyl alcohol and recrystallized from hot ethanol solution. The crystalline material having a melting point of 99-100° C. was identified as N,N' bis [2-(oxycarballyloxy)ethyl] oxamide having the molecular structure:

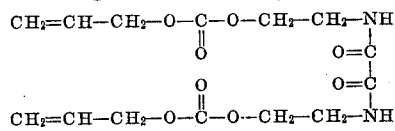

*Example III*

The procedure of Example II was duplicated except that ethyl adipate was used in place of ethyl oxalate. An ester N,N' bis [2-(oxycarballyloxy)ethyl] adipamide having the following molecular structure was obtained:

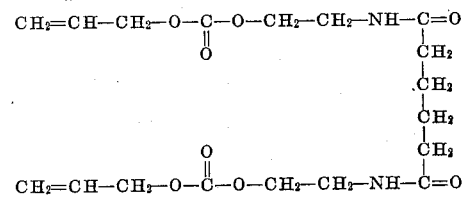

*Example IV*

The procedure of Example I was used to prepare N,N' bis [2-(oxycarbovinyloxy)ethyl] urea by substituting vinyl chloroformate for allyl chloroformate. An actively polymerizable monomer was thereby produced.

Although the invention has been described with respect to specific modifications, it is not intended that the invention shall be limited to said modifications except as defined in the appended claims.

What I claim is:

1. An N,N' bis [(oxycarbalkenyloxy)alkyl] substituted diamide of a dibasic acid, wherein the alkenyloxy group contains an olefinic bond attached to the second carbon atom from the oxygen atom therein.

2. An N,N' bis [(oxycarbalkenyloxy)alkyl] urea, wherein the alkenyloxy group contains an olefinic bond attached to the second carbon atom from the oxygen atom therein.

3. An N,N' bis [(oxycarbalkenyloxy)alkyl] adipamide, wherein the alkenyloxy group contains an olefinic bond attached to the second carbon atom from the oxygen atom therein.

4. An N,N' bis [(oxycarbalkenyloxy)alkyl] oxamide, wherein the alkenyloxy group contains an olefinic bond attached to the second carbon atom from the oxygen atom therein.

5. A new compound N,N' bis [(oxycarballyloxy)ethyl] urea.

6. A new compound N,N' bis [(oxycarballyloxy)ethyl] adipamide.

7. A new compound N,N' bis [(oxycarballyloxy)ethyl] oxamide.

FRANKLIN STRAIN.